No. 705,233. Patented July 22, 1902.
E. M. HARTELL.
GARDEN IMPLEMENT.
(Application filed Nov. 4, 1901.)
(No Model.)
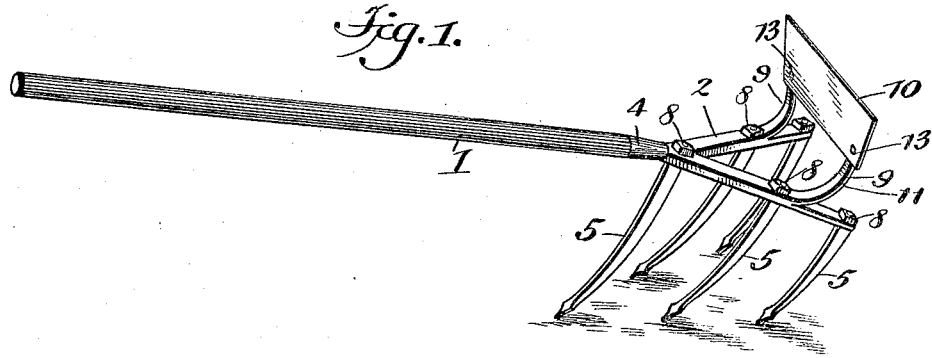
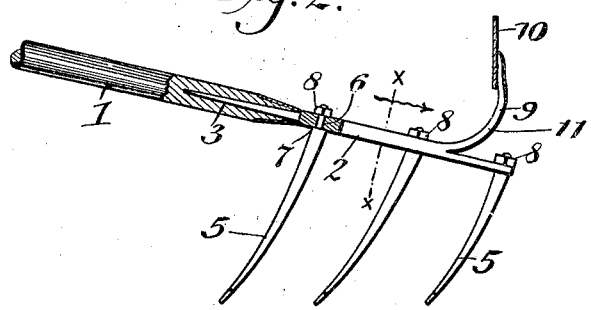
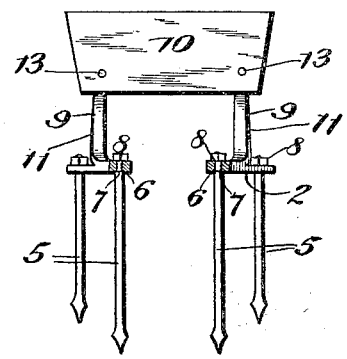
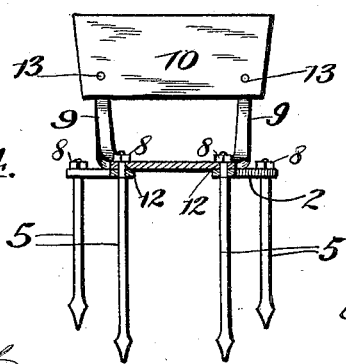
WITNESSES:
INVENTOR
Etta M. Hartell,
BY
her ATTORNEY.

UNITED STATES PATENT OFFICE.

ETTA M. HARTELL, OF BROOKLYN, NEW YORK.

GARDEN IMPLEMENT.

SPECIFICATION forming part of Letters Patent No. 705,233, dated July 22, 1902.

Application filed November 4, 1901. Serial No. 81,072. (No model.)

*To all whom it may concern:*

Be it known that I, ETTA M. HARTELL, a citizen of the United States, residing at Brooklyn, in the county of Kings and State of New York, have invented certain new and useful Improvements in Garden Implements, of which the following is a specification.

This invention relates to garden implements, and particularly to such as are adapted to manual use in thickly-planted crops, where a horse implement cannot be used on account of the damage likely to ensue.

One object of my invention is to provide a combination-tool which will improve the quality and increase the quantity of the work each man does.

Another object of my invention is to provide a combination-tool which when one part is used and the tool is drawn forward will penetrate the soil and loosen it deeply and when pushed backward will pulverize the ground, free and clean the teeth of the tool, and destroy the weeds, and which when the other part is used will do the work of a hoe and is so balanced that when such other part is required the handle is simply turned and such other part brought into operative position.

Another object of my invention is to provide a combination-tool one part of which has detachable solid-steel teeth adapted to be easily removed and resharpened or replaced by any blacksmith when worn.

In the drawings, Figure 1 is a perspective view of a garden-tool embodying my improvements. Fig. 2 is a longitudinal sectional view of the same. Fig. 3 is a sectional view on the line $x\,x$, Fig. 2, looking the way the arrow points. Fig. 4 is a view similar to Fig. 3, showing a modification of my improvements.

Corresponding parts in all the figures are denoted by the same reference characters.

My invention comprises in general a V-shaped frame adapted to be secured at its closed end to a suitable handle, arms rising from said frame near its open end, a hoe-shaped blade carried by said arms, and teeth depending from said frame oppositely to said arms, said teeth decreasing in length from the closed end of said frame toward its open end.

In the form shown in the drawings and which, if desired, may be the preferred form 1 designates the handle of my improved garden implement, which handle may be of any suitable material, herein shown as wood, and of suitable length, preferably somewhat longer than the ordinary hoe-handle. A V-shaped frame 2 is adapted to be secured at its closed end to the handle 1 in any suitable manner. In the form shown the handle 1 is provided at one end with a socket 3 and a reinforcing-collar 4, and the V-shaped frame 2 has its closed end reduced in size and prolonged and adapted to fit tightly in said socket 3. A series of teeth 5 depend from the V-shaped frame 2. The teeth 5 may be made integral with the V-shaped frame 2 or secured thereto in any suitable manner. A convenient mode of securing the teeth 5 to the V-shaped frame 2 and that herein shown consists in providing the V-shaped frame 2 at its apex and along each of its branches with apertures 6, preferably square in cross-section, and in reducing the upper part of the teeth 5 in size, forming shoulders 7, which abut against the face of the V-shaped frame, portions square in cross-section and adapted to fit in the apertures 6, and screw-threaded ends adapted to receive the nuts 8, whereby the teeth 5 may be secured in the apertures 6. The teeth 5 decrease in length from the tooth secured at the apex of the V-shaped frame 2 to the teeth secured at the ends of the two branches of the V-shaped frame 2, so that when the tool rests upon the teeth 5 the handle 1 will be elevated into position to be grasped by the operator naturally. The teeth 5 are inclined forward at an angle to the plane of the V-shaped frame 2, which will cause the teeth 5 to penetrate the ground when the handle 1 is held in a natural position and the tool is drawn forward, and the lower ends of the teeth 5 are pointed, preferably in arrow or chisel shape, and sharpened to facilitate their entrance into the ground.

Arms 9 rise from the V-shaped frame 2, near its open end, oppositely to the teeth 5, and carry at their upper ends a hoe-shaped blade 10. The arms 9 may be formed integrally with the V-shaped frame 2 by splitting the outer ends of the branches of the V-shaped frame 2 horizontally and turning the upper part 11, formed by such split, upward, or the arms 9 may be secured to the V-shaped frame 2 in any suitable manner, as by providing the arms 9 at their inner ends with apertures 12, adapted to receive the upper ends of two of the teeth 5 before the nuts 8 are screwed upon said teeth 5. The hoe-shaped blade 10 may be made integral with the arms 9 or secured thereto in any suitable manner, herein shown as rivets 13.

Ordinarily garden implements when provided with teeth have the lower ends of such teeth in the same horizontal plane, so that when the implement rests upon such teeth the handle extends horizontally at a distance from the ground equal to the length of such teeth. Consequently when an operator takes hold of the handle to use the implement he raises the front teeth, if there is more than one row, off the ground in elevating the end of the handle to the proper position for use. Hence while in use the rows of teeth will always penetrate the ground to different depths and the ground is not broken up evenly and to a uniform depth. This difficulty is entirely overcome in my device. By reason of the decreasing length of the teeth 5 in my device from front to rear the handle 1 is presented in an operative position when the implement rests upon the teeth 5. The ground is therefore penetrated by the teeth 5 to a uniform depth when my device is used and evenly broken up, which is most important to successful cultivation.

The operation and advantages of my invention will be readily understood and appreciated.

Owing to the relative lengths of the teeth 5 the handle 1 is held normally in position to be readily and naturally grasped by the operator, and owing to the inclination of the teeth 5 and their sharp points the mere pulling forward forces them into the ground, which they will penetrate deeply and loosen thoroughly. Then pushing the tool backward pulverizes the earth, frees and cleans the teeth 5, and destroys the weeds. When it is desired to use the hoe-shaped blade 10, the operator has simply to turn the handle 1 and the tool is so balanced that the blade 10 will be in operative position. If the points of the teeth 5 get dull, the teeth 5 may be readily detached and resharpened or replaced, as is required, by an ordinary mechanic.

I do not desire to be understood as limiting myself to the details of construction and arrangement as herein described and illustrated, as it is manifest that variations and modifications may be made in the features of construction and arrangement and in the adaptation of the device to various conditions of use without departing from the spirit and scope of my invention and improvements. I therefore reserve the right to all such variation and modification as properly falls within the scope of my invention and the terms of the following claims.

Having thus described my invention, I claim and desire to secure by Letters Patent—

1. An improved garden-tool, comprising a handle, a V-shaped frame secured at one end of such handle, teeth depending from said frame and provided with sharpened ends, arms rising from said frame near the open end oppositely to said teeth and a hoe-shaped blade carried by said arms.

2. An improved garden-tool, comprising a handle, a V-shaped frame secured at one end of such handle and provided with apertures, square in cross-section, in its apex and in each of its branches, teeth having their upper ends reduced in size forming shoulders abutting against the frame, portions adapted to fit the apertures and screw-threaded ends adapted to receive nuts adapted to be screwed on said ends, arms integral with said frame and rising from said frame near its open end, and a hoe-shaped blade secured to the ends of said arms.

3. An improved garden-tool, comprising a handle, a V-shaped frame secured at one end of said handle and provided with depending teeth and upwardly-projecting arms and a hoe-shaped blade carried by said arms.

4. An improved garden-tool, comprising a handle, a V-shaped frame secured to one end of said handle, forwardly-inclined teeth secured in said frame and provided with sharpened ends, said teeth decreasing in length from the one at the apex of said frame to those at the ends of its branches, arms secured to said frame near its open end and extending oppositely to said teeth, and a hoe-shaped blade secured to the ends of said arms.

5. An improved garden-tool, comprising a handle, a V-shaped frame secured at one end of said handle, forwardly-inclined teeth detachably secured in said frame and provided with sharpened points, said teeth decreasing in length from the one at the apex of said frame to those at the ends of the branches of said frame, arms detachably secured near the open end of said frame and extending oppositely to said teeth and a hoe-shaped blade secured to the ends of said arms.

6. An improved garden-tool, comprising a handle, a V-shaped frame secured at its closed end to one end of the handle and provided with perforations in its apex and in each of its branches, forwardly-inclined teeth provided with sharpened points and with reduced screw-threaded upper ends adapted to fit in said apertures and be secured therein by nuts, a U-shaped member provided with perforations at the ends of its base whereby it may be secured on the upper ends of a pair of the outer teeth, the arms of said member being turned up oppositely to the teeth, and a hoe-shaped blade secured to the ends of said arms.

In testimony whereof I have signed my name in the presence of the subscribing witnesses.

ETTA M. HARTELL.

Witnesses:
HARTWELL P. HEATH,
JOHN M. HOCTOR.